United States Patent [19]
Shimizu et al.

[11] Patent Number: 5,583,794
[45] Date of Patent: Dec. 10, 1996

[54] SYSTEM FOR COMPRESSING AND DECOMPRESSING MULTIDIMENSIONAL IMAGES, CAPABLE OF EFFICIENTLY DECOMPRESSING IMAGES WITHOUT ASSURANCE OF EQUIVALENCE IN PIXEL OR FRAME

[75] Inventors: Kyoichi Shimizu, Yokohama; Yoshiko Hozumi, Zushi; Masayou Kawauchi, Kamakura; Shinji Ootake, Yokosuka, all of Japan

[73] Assignee: Victor Company of Japan, Ltd., Yokohama, Japan

[21] Appl. No.: 187,470

[22] Filed: Jan. 28, 1994

[30] Foreign Application Priority Data

Feb. 3, 1993 [JP] Japan ............................ 5-39492

[51] Int. Cl.$^6$ .................................................. G06K 9/36
[52] U.S. Cl. .................... 364/514 R; 382/243; 382/199; 348/391
[58] Field of Search ............................ 364/514; 382/243, 382/199; 348/391

[56] References Cited

U.S. PATENT DOCUMENTS

| | | | |
|---|---|---|---|
| 4,455,571 | 6/1984 | Shimizu et al. | 358/138 |
| 4,609,993 | 9/1986 | Shimizu | 364/522 |
| 4,630,307 | 12/1986 | Cok | 382/25 |
| 4,847,677 | 7/1989 | Music et al. | 368/13 |
| 5,199,082 | 3/1993 | Venema | 382/22 |
| 5,253,041 | 10/1993 | Wine et al. | 358/11 |
| 5,293,580 | 3/1994 | Shimizu | 382/56 |
| 5,325,124 | 6/1994 | Keith | 348/391 |
| 5,365,604 | 11/1994 | Kwok et al. | 382/54 |
| 5,420,942 | 5/1995 | Levit | 382/276 |

Primary Examiner—Ellis B. Ramirez
Assistant Examiner—Patrick J. Assouad
Attorney, Agent, or Firm—Jacobson, Price, Holman & Stern, PLLC

[57] ABSTRACT

A multidimensional image compression and decompression system wherein, during compression, regardless of how high or low the pixel density is in an image used as an object for processing image data, compressed image data is obtained by extracting only characteristic points included in the image. During decompression, luminance data of pixels except those corresponding to characteristic points are determined by an interpolational plane or solid body which in turn is determined by a plurality of adjacent characteristic points when a position and luminance value of the characteristic points are used for transmission, recording and restoration of images, with respect to image data distributed in two-dimensions and three-dimension when a time base is included. Therefore, it is possible to decompress the multidimensional compressed image using only a short calculation time.

8 Claims, 8 Drawing Sheets

SYSTEM FOR COMPRESSING AND DECOMPRESSING MULTIDIMENSIONAL IMAGES, CAPABLE OF EFFICIENTLY DECOMPRESSING IMAGES WITHOUT ASSURANCE OF EQUIVALENCE IN PIXEL OR FRAME

BACKGROUND OF THE INVENTION

The present invention relates to a system for compressing and decompressing multidimensional images, and more specifically, to a system capable of efficiently decompressing images in a system in which a pixel equivalence or a frame equivalence is not assured between compression and decompression sides, for example, in an image transmission between different types apparatuses and devices.

There have been conventionally provided many kinds of methods with respect to a compression of image data. For example, there is a method adopting linear (equivalent) quantization means which equally divides a signal level with respect to each sample value of digital image signals, and replaces values included in each range by a representative value. In this method, a data amount from 6-bit (64 gradation) to 8-bit (256 gradation) is required with respect to a generally natural image in order to make the difference between the representative point and an original value be unnoticeable. Accordingly, when the equivalent quantization means records the digitalized image signals as they are, it is necessary to process a large amount of data with respect to each sampled value.

Therefore, when the image signals are coded by a smaller amount of data, there are some attempts. For example, a first attempt uses the human senses of sight and hearing according to which a person is keen of sight with respect to changes in a portion containing subtle signal changes, and according to which a person finds it difficult to detect the changes in a portion containing large signal changes even though there are errors having a predetermined degree. A second attempt transmits few approximate values of original data by using a high adjacent correlation of luminance values of each pixel after an image is divided into a plurality of pixels on the basis of the utilization of time and space bases in the data signals as an object for recording. Furthermore, a third attempt transmits the differences between pixels or frames on the same basis as in the same as the second attempt. A fourth attempt records, transmits and reproduces the image by compressing and decompressing data after reception of the digital data of which a data amount is compressed by adapting several kinds of highly efficient coding methods in which the data amount of each sample decreases by reducing a frequency component based on the fact that the high-frequency component is small. It is well-known that these several attempts have been conventionally performed.

In the above conventional general image data compression methods, since the extreme restoration of divided pixels is treated as being important, there are many cases where pixel numbers coincide with each other between an original image and a restored (decompressed) image. Accordingly, when compression and decompression are performed between images each having different pixel numbers, it is necessary to individually perform an interpolation and a thinning-out of the pixels after the decompression. This means that the conventional image data compression system depends upon a physical image component to a degree because only true and effective data are extracted to be restored.

By the way, when an image taken by such an imaging device is used to a block copy in printing, can be an example is provided wherein a pixel density is quite different between two images having different pixel numbers as described above. A pixel density of an image obtained by an imaging device is "500×500" pixels per one image at the most, but a pixel density of an image of an electronic plate-making machine is "several thousands×several thousands" pixels per one image, which differs widely from the image obtained by the imaging device. Accordingly, even though the above-mentioned image data compression and decompression system of the pixel equivalence is not applied at all, an alias occurs by a pixel magnification. Furthermore, when an interpolation is performed without taking the above-mentioned pixel magnification, it is impossible to avoid a deterioration of the picture quality by an interpolational distortion because a weight average value of already-known data is appropriated for a broad interpolation area. On the contrary, when the pixel density of the original image is "several thousands×several thousands" as described above, since a correlation is extremely high between adjacent pixels, it is theoretically possible to extremely compress the image data. However, the conventional image data compression and decompression system has the problem that it is impossible to increase a compression ratio because the conventional system has the condition that pixel numbers coincide with each other between the above-mentioned original image and restored (decompressed) image.

SUMMARY OF THE INVENTION

The present invention is provided for removing the above-mentioned problem, and has an object to provide a multi-dimensional image compression and decompression system capable of efficiently decompressing images by using a plurality of characteristic points even in a system in which a pixel equivalence and a frame equivalence are not assured between a compression side and a decompression side.

In order to achieve the above object, a multidimensional image compression and decompression system according to the present invention, transmits and records image data according to luminance data distributed in two dimensions in a static image by using a luminance value and a position of characteristic points which are the local maximum points in a positive and negative of a curvature of an equal luminance line of a luminance function, or points at which the difference between the equal luminance line of the luminance function and a straight line obtained by a straight line approximation thereof becomes more than a predetermined threshold value, and determines the luminance data of pixels without the characteristic points by an interpolation plane which is determined by a plurality of adjacent characteristic points at a decompression when the positions of the characteristic points and the luminance value are used in an image restoration.

Furthermore, the system as an aspect according to the present invention, transmits and records image data according to luminance data distributed in two dimensions in a static image and three dimensions including a time base by using a luminance value and a position of characteristic points which are the local maximum points in a positive and negative of a curvature of an equal luminance plane of a luminance function, or points at which the difference between the equal luminance plane of the luminance function and a plane obtained by a plane approximation thereof becomes more than a predetermined threshold value, and determines the luminance data of pixels without the characteristic points by an interpolation solid body which is determined by a plurality of adjacent characteristic points at a decompression when the positions of the characteristic points and the luminance value are used in an image restoration.

Still furthermore, the system as another aspect according to the present invention, transmits and records image data according to luminance data distributed in two dimensions in a static image and three dimensions including a time base by using a luminance value and a position of characteristic points which are the local maximum points in a positive and negative of a curvature of an equal luminance line of a luminance function in each pair of a plurality of pairs of the luminance data distributed in the two dimensions, or points at which the difference between the equal luminance line of the luminance function of each pair and a straight line obtained by a straight line approximation thereof becomes more than a predetermined threshold value, and determines the luminance data of pixels without the characteristic points by an interpolation solid body which is determined by a plurality of adjacent characteristic points at a decompression when the positions of the characteristic points and the luminance value are used in an image restoration.

By the present invention, regardless of the level of the pixel density in the image used as an object for image data processing, only the characteristic points are extracted from the image to obtain image data to which image information is changed by a compression. For reproducing a new image on another pixel density plane without restoring the image of the above-mentioned image data at decompression, the local maximum points of the positive and negative in the curvature of the equal luminance line or plane, are extracted as the characteristic points from the image information which is distributed in the two dimensions or the three dimensions including the time base, and the points at which the difference between the equal luminance line or plane and the approximated straight line or plane thereof becomes more than the predetermined threshold value, are extracted from the image, thereby transmitting and recording the position of the characteristic points in the image and the luminance value. When the position of the characteristic points and the luminance value are used for restoring the images, the luminance data of the pixels without the characteristic points is determined by the interpolation line or solid body which is determined by the plurality of the characteristic points adjacent to one another at the decompression. When the characteristic points are obtained by the plurality of pairs of luminance data which are distributed in the two dimensions and the three dimensions, the maximum value or the difference between the equal luminance line or plane and the threshold value is adopted as the characteristic points. In the case where the characteristic points are used for a transmission, recording and restoration of the image, since the luminance data of the pixels without the characteristic points are used on the basis of the interpolation plane or solid body, it is possible to easily decompress the multidimensional image.

As described above, the multidimensional image data compression and decompression system according to the present invention has an effect whereby the decompression of the multidimensional image can be easily performed to determine the luminance data of the pixels without the characteristic points by using an interpolational plane or solid body which is determined by the plurality of characteristic points adjacent to one another at the decompression of the image, in which the characteristic points are adopted from the local maximum points in the positive and negative on the curvature of the equal luminance line of the luminance function distributed in the two dimensions and three dimensions, or the points at which the difference between the approximated straight line or plane and the luminance value is more than the predetermined threshold value.

Accordingly, in this multidimensional image compression and decompression system, regardless of the level of the pixel density in the image used as an object of image data processing, the compressed image data is obtained by extracting only the characteristic points, and a new picture can be drawn on the plane of another pixel density while the pixels are not restored by the image data at the decompression. Therefore, the present invention allows the multidimensional image compression and decompression system to be able to easily decompress the image by using an approximation of the following equation (A) at the restoration of the image which is obtained by using the position and luminance value of the characteristic points.

$$Z_a = \Sigma(z_i/r_i)/\Sigma(1/r_i) \tag{A}$$

As a result, it is possible to easily realize highly efficient compression corresponding to a data amount of the image, regardless of a physical condition such as the difference between pixel numbers of the original image and reproduced image, in which the original image is to be compressed with respect to the image data and the reproduced image is obtained by the decompression.

DETAILED DESCRIPTION OF THE PREFERRED EMBODIMENTS

Figure 1:
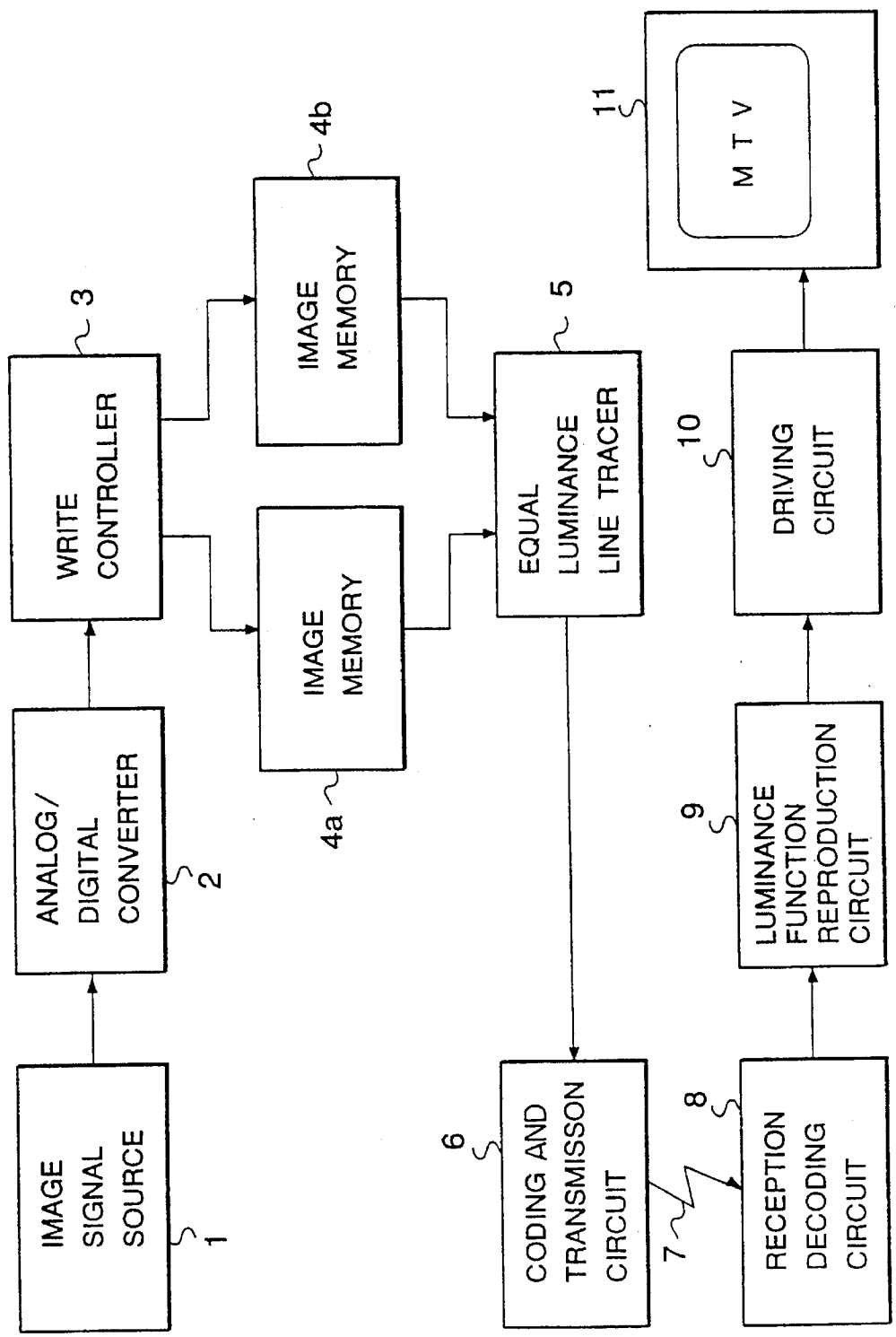
FIG. 1 is a block diagram showing a multidimensional image compression and decompression system of an embodiment according to the present invention.

A multidimensional image compression and decompression system according to preferred embodiments of the present invention will now be described with reference to the attached drawings.

The multidimensional image compression and decompression system according to the present invention, efficiently compresses and decompresses image data distributed in a two dimensions or a three dimensions when a time base is added to the two dimensions. Even though the image data in the two dimensions or the data in the three dimensions as an object correspond to not only images including a single luminance (so-called a black-and-white image) but also a color image having a lightness and a chromaticity (a hue and saturation) in the system according to the present invention, there will be conveniently described hereinunder the case where images only having luminance data (black-and white image) are compressed.

Here, images can be generally expressed by the following equation (1);

$$z = f(x, y) \quad (1)$$

where z is a luminance in a black-and-white static image, x is the position of the horizontal direction, and y is that of the vertical direction.

Furthermore, moving images can be expressed by the following equation (2), if a time base t is added;

$$z = f(x, y, t) \quad (2)$$

Now, if an "f" denotes a multi-degree function, the luminance z in the image is shown by the following equation(3);

$$z = A_1 x + A_2 x^2 + \ldots + A_n x^n + \\ B_1 y + B_2 y^2 + \ldots + B_n y^n + \\ C_1 t + C_2 t^2 + \ldots + C_n t^n + D \quad (3)$$

Even though a transmission of the images means that the luminance function determined in the transmission side is reproduced in the reception side, the general digital image transmission does not analytically treat the luminance function and transmits the entire table of function values which are generated from the luminance function. On the contrary, the conventional general compressing transmission performs a highly efficient coding by using an adjacent correlation of the table values as they are, or adopts means for processing the table values in the same manner after orthogonal transformation. However, there is less compression and transmission in the method of the prior art when compared to directly extracting the characteristic values of the function by an analyzed processing with respect to the luminance function.

It is possible to say that the multidimensional image compression and decompression system according to the present invention belongs to image compression and decompression systems for directly extracting characteristic points of a function by analytic processing with respect to a luminance function. In the multidimensional image compression and decompression system according to the present invention, regarding image data such as two-dimensional luminance data in the static image or two- and three-dimensional luminance data, an equal luminance line (plane in the case of three-dimensional data) shown in FIG. 4C is extracted, characteristic points are determined by local maximum points of the positive and negative in the curvature of the equal luminance line (plane) or points at which the difference between the equal luminance line (plane) and an approximated line (plane) thereof becomes more than a predetermined threshold value. On the decompression side, positions of the characteristic points and the luminance value are used for transmission (recording), and reproduction of the images. Namely, since the large compression of the image data can be realized by dumping the luminance data of the pixels which has little influence for reproducing the luminance function and the transmitted (recorded) characteristic points perform a re-interpolation of the luminance function during decompression of the image data, un-transmitted (unrecorded) data can be reproduced by an interpolation.

In FIG. 1 showing the multidimensional image compression and decompression system according to the present invention, numeral 1 denotes an image signal source as an object for compressing and decompressing multidimensional image data, which corresponds to an imaging device (a television camera) or a video tape recorder (VTR) and the like for generating image signals. Numeral 2 denotes an analog/digital converter, 3 denotes a write controller which performs a write control when the digital data issued from the analog/digital converter is written in image memories 4a and 4b, 5 denotes an equal luminance line tracer (a detailed illustration is provided in FIG. 2), 6 denotes a coding and transmission circuit, 7 denotes a transmission line (or a recording medium), 8 denotes a reception decoding circuit (or reproducing and decoding circuit), 9 denotes a luminance function reproduction circuit (a detailed illustration is provided in FIG. 3), 10 denotes a driving circuit, and 11 denotes a monitor television receiver.

Here, the following are a principle of compression for the image data and a principle of restoration (decompression) of the image in the multidimensional compression and decompression system according to the present invention. First, the following criterions are applied with respect to characteristic points when the local maximum points of the positive and negative in the curvature of the equal luminance line (or plane) are extracted as the characteristic points, or when the difference between the equal luminance line (plane) and the approximated line (plane) thereof becomes more than the predetermined threshold value:

1. A pixel a as an investigation object is deemed to be a characteristic point when a curve of the equal luminance line (plane) before and after the pixel a exceeds the predetermined angle of inclination;

2. An intermediate pixel located along the equal luminance line (or plane) between two other pixels which are also located along the equal luminance line (or plane) is deemed to be a characteristic point when a first detected one of the two other pixels is a characteristic point and the distance separating the two other pixels exceeds a predetermined threshold distance on a virtually straight line in a predetermined direction along the equal luminance line (or plane).

Figure 4A:
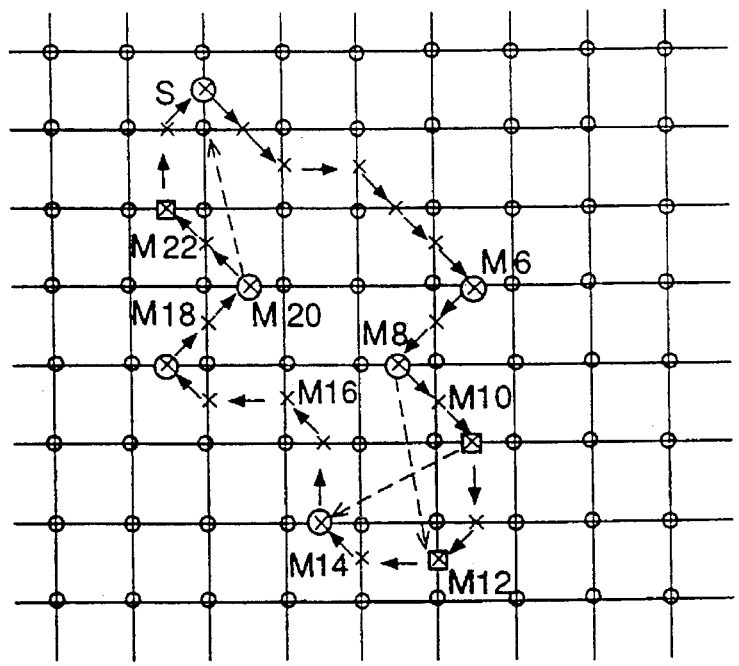
FIG. 4A–4C are diagrams illustrating a method of detecting an equal luminance line and a method of determining characteristic points, respectively.
Figure 4B:
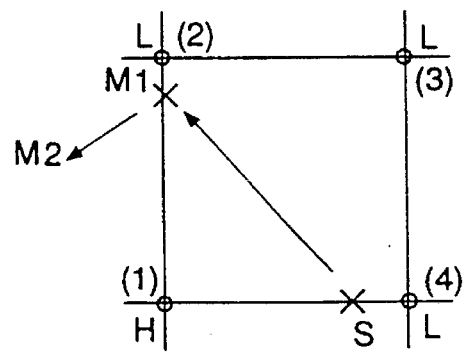
Figure 4C:
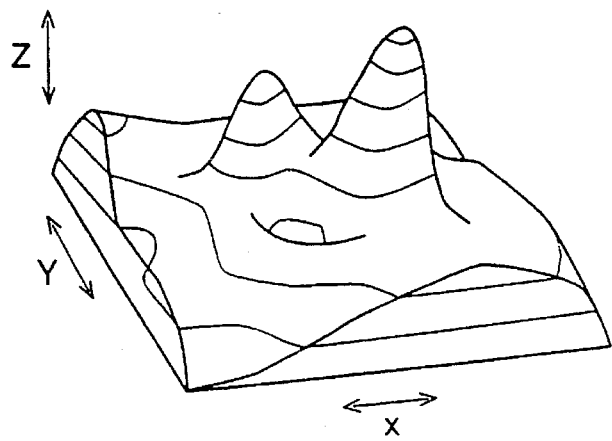

The followings are description for a detailed example when a characteristic point is extracted from an objective image of the image compression and decompression by using FIGS. 4A–4C showing luminance distribution functions in the two-dimensional screen of an arbitrary static image on the basis of the above-mentioned criterions. FIG. 4A shows an example of an equal luminance line (more precisely a sequence of equal luminance values) of the luminance distribution functions in the two-dimensional screen. An extraction of the equal luminance line of the luminance distribution functions in the two-dimensional screen is performed by the following procedure, as shown in FIG. 4B with respect to a search method for searching points having an equal luminance. In FIG. 4B, numerals (1), (2), (3) and (4) show four pixels, luminance values of the pixels (1), (2), (3) and (4) are shown by large characters H and L (H denotes a high luminance value and L denotes a low luminance value), and a point S where a first extracted value is obtained is set to a starting point for the extraction of the equal luminance line. Since the point S exists at the intermediate point between the pixels (1) and (4), the luminance value of the coordinate position may use a proportional allotment value corresponding to the luminance values of the pixels (1) and (4).

For tracing an equal luminance line obtained by combining the starting point S and a point having an equal luminance value equivalent to that of the point S, the equal luminance value can be detected on a point M1 on a side (1)-(2) after the investigation as to whether or not there are points having the luminance value equal to that of the starting point S (the equal luminance value) in the order of a side (1)-(2), a side (2)-(3), and a side (3)-(4) which are portions of a square denoted by the four pixels (1) through (4). After the detection of the point M1 of equal luminance value, a point M2 is detected as the succeeding point having the equal luminance value by repeating the above-mentioned procedure, and the extraction of the equal luminance line advances by tracing the points having the equal luminance value in order. When the equal luminance line is extracted, the side of which the equal luminance line has been already intersected is excluded from the investigation objects (except the starting point S).

As described above, one of the equal luminance lines of the luminance distribution functions on the two-dimensional screen as shown in FIG. 4A is extracted by detection of the sequential points having equal luminance values which are equal to the predetermined luminance value.

In FIG. 4A showing as an example of the equal luminance lines of the luminance distribution functions on the two-dimensional screen, a point M6 is determined as one of the characteristic points according to the criterion 1 mentioned above, which is a sharply changed portion of a course of the equal luminance line formed by a continuity of the equal luminance points sequentially traced from the point S as the starting point (Also with respect to points M8, M14, M16, M18 and M20, they are deemed to be characteristic points according to the criterion 1 mentioned above).

After the point M8 exhibiting the equal luminance value is detected, when the trace reaches a point M12 through the successive equal luminance points, a point M10, which has a predetermined distance corresponding to a virtual straight line M8–M12, is deemed to be a characteristic point according to the above criterion 2 even though the point M10 is not a sharply changing point in the direction of the trace. The same determination is performed for points M12 and M22.

In this manner, since the image data are dumped by the displacement of the luminance distribution function in the two-dimensional screen by the equal luminance line and the luminance distribution function is intensified to the characteristic point of the equal luminance line, it is possible for the multidimensional image compression and decompression system according to the present invention to transmit and record the image data using highly compressed data.

As described above, in the multidimensional image compression and decompression system according to the present invention, since the two-dimensional luminance data as the compression object are displaced by a small amount of position data of the characteristic points and luminance data, the characteristic points determine the luminance value of the corresponding point in the decompression screen (it is unnecessary for the pixels in the decompressed image to coincide with the pixels in the original image) when the compressed and transmitted (recorded) image data are decompressed to obtain the reproduced image, and the present invention adopts the decompression method so as to decrease the influence on proportion associated with a distance from the characteristic points. Even though the decompression of the image data is performed by a straight line interpolation between the characteristic points in one dimension, the decompression of the image data on the multidimensional space is performed by using a plane interpolation and a solid body interpolation which will be described below, as shown in FIG. 5.

Figure 5:
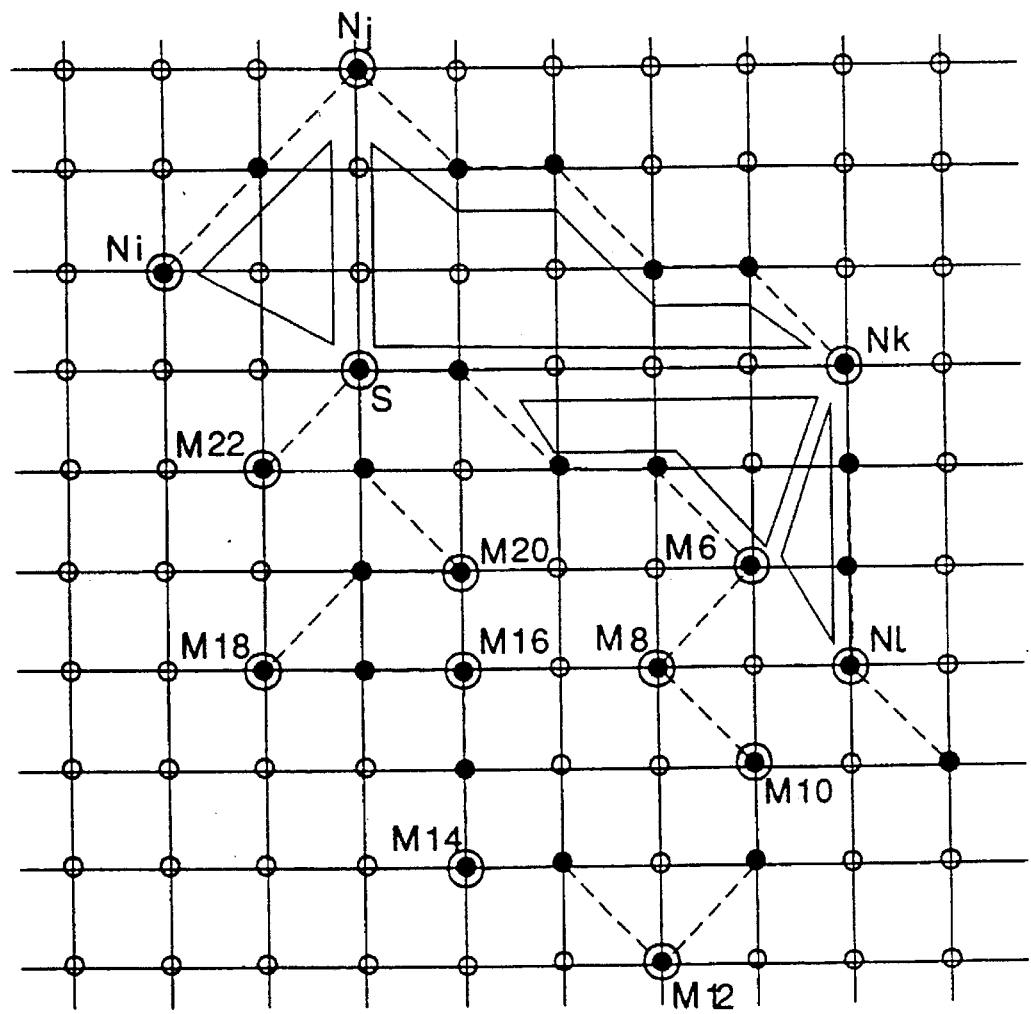
FIG. 5 is a diagram illustrating a constitutional principle and an operational principle of the luminance function reproduction circuit.

FIG. 5 shows an equal luminance (contour) line reproduced on the image memory on the reproduction side by using position data (addresses) of the characteristic points S, M6, M8, M10, M12, M14, M16, M18, M20 and M22 shown in FIG. 4A and obtained through the procedure shown in FIGS. 4A–4C. In FIG. 5, the equal luminance line (of an M-group) is shown by a line sequentially connecting the characteristic points S, M6, M8, M10, M12, M14, M16, M18, M20 and M22. A dotted line, which sequentially connects the characteristic points Ni, Nj, Nk and Nl in FIG. 5, shows an equal luminance line different from the equal luminance line by the characteristic points of the M-group, for example an N-group.

Here, when the luminance value shown by the N-group satisfies an area between the equal luminance line of the M-group and the equal luminance line of the N-group, it is impossible to obtain a high quality decompression image because of so-called artificial contour phenomenon occurring by the clear luminance difference between the luminance value of the N-group and the luminance value of the area enclosed by the equal luminance line of the M-group. Accordingly, in order to prevent the artificial contour phenomenon from occurring, the characteristic points included in the M-group and the characteristic points included in the N-group are satisfied by the following equation (A) for an approximating calculation:

$$za = \Sigma(zi/ri)/\Sigma(1/ri) \tag{A}$$

where, ri is a distance from a specified pixel $\underline{a}$ to each pixel of the characteristic points, and zi is a luminance value of each pixel of the characteristic points.

Here, when the specified pixel $\underline{a}$ is supposed in the decompression screen, the relationship between the luminance value zk at the characteristic point k as one of the characteristic points and the luminance value za of the pixel $\underline{a}$ will be obtained by the following equation (4);

$$za = zk + (\alpha ak \times rk) \tag{4}$$

where, an $\alpha$ is a proportionality constant.

The ($\alpha k \times rk$) in the second term of the right side of the above equation shows a discrepancy of the luminance values between the luminance value of the pixel $\underline{a}$ and the luminance value of the characteristic point k, and the value of the ($\alpha k \times rk$) is proportional to the distance r. The discrepancy ($\alpha k \times rk$) exists in the positive and negative which are reflected by a proportional constant $\alpha$, and a total sum of all $\alpha$ values is zero in the entire interpolation space as shown in an equation (5) as follows;

$$\Sigma \alpha k = 0 \tag{5}$$

When an term of "$\alpha$" is eliminated from the equation (4) by adding the condition of the equation (5) for obtaining a general interpolation equation of the luminance value za of the pixel $\underline{a}$, the above-mentioned equation (A) can be obtained.

$$za = \Sigma(zi/ri)/\Sigma(1/ri) \tag{A}$$

If the luminance value zi of all characteristic points and the distance r from the pixel a as an object of the interpolation are obtained, the equation (A) shows that it is to obtain luminance values for all the uninterpolated pixels in the screen by the interpolation (even though the pixels in the reproduced image do not coincide with the pixels in the original image). However, since the equation (A) is over the practical calculation amount by increasing the characteristic points, an interpolation luminance value is calculated an approximation by using an interpolational plane which is determined by three adjacent characteristic points enclosing an interpolated pixel.

Since one plane is determined by three points in the space, as is well-known, an interpolation triangle can be obtained by forming a group from the three characteristic points. Accordingly, the luminance values of the pixels in each triangle of three characteristic points "Ni, Nj, S", "Nk, M6, S" and "Nj, Nk, S" in FIG. 5 can be satisfied by a plane interpolation of an approximating calculation using the equation (A), respectively.

Figure 7:
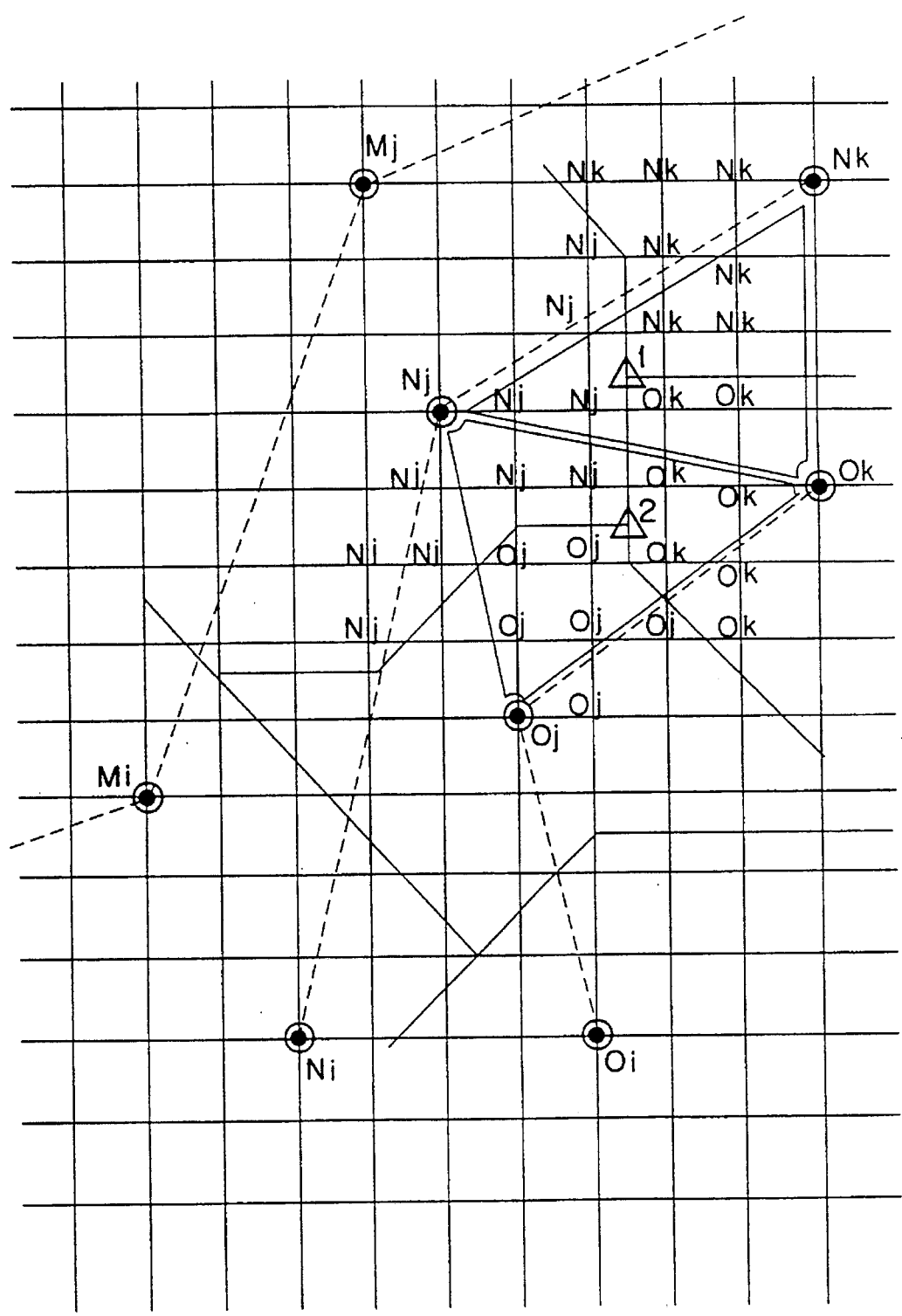
FIG. 7 is a diagram illustrating operation of a plane interpolation for reproducing a luminance function.

The determination of the interpolation plane needs an extraction of the adjacent three characteristic points, and the extraction principle of the adjacent three characteristic points will be described by using FIG. 7. In FIG. 7, pixels Mi and Mj are characteristic points on the equal luminance line of an M-group in which the luminance value thereof (the equal luminance line) is included in an M, pixels Ni, Nj and Nk are characteristic points on the equal luminance line of an N-group in which the luminance value thereof (the equal luminance line) is included in an N, and pixels Oi, Oj and Ok are characteristic points on the equal luminance line of an O-group in which the luminance value thereof (the equal luminance line) is included in an O. When the images are decompressed, the data of the characteristic point group having the above-mentioned equal luminance value is stored in the image memories on the reproduction side. In the figure, respective equal luminance lines are shown by the different dotted lines, respectively.

Figure 6:
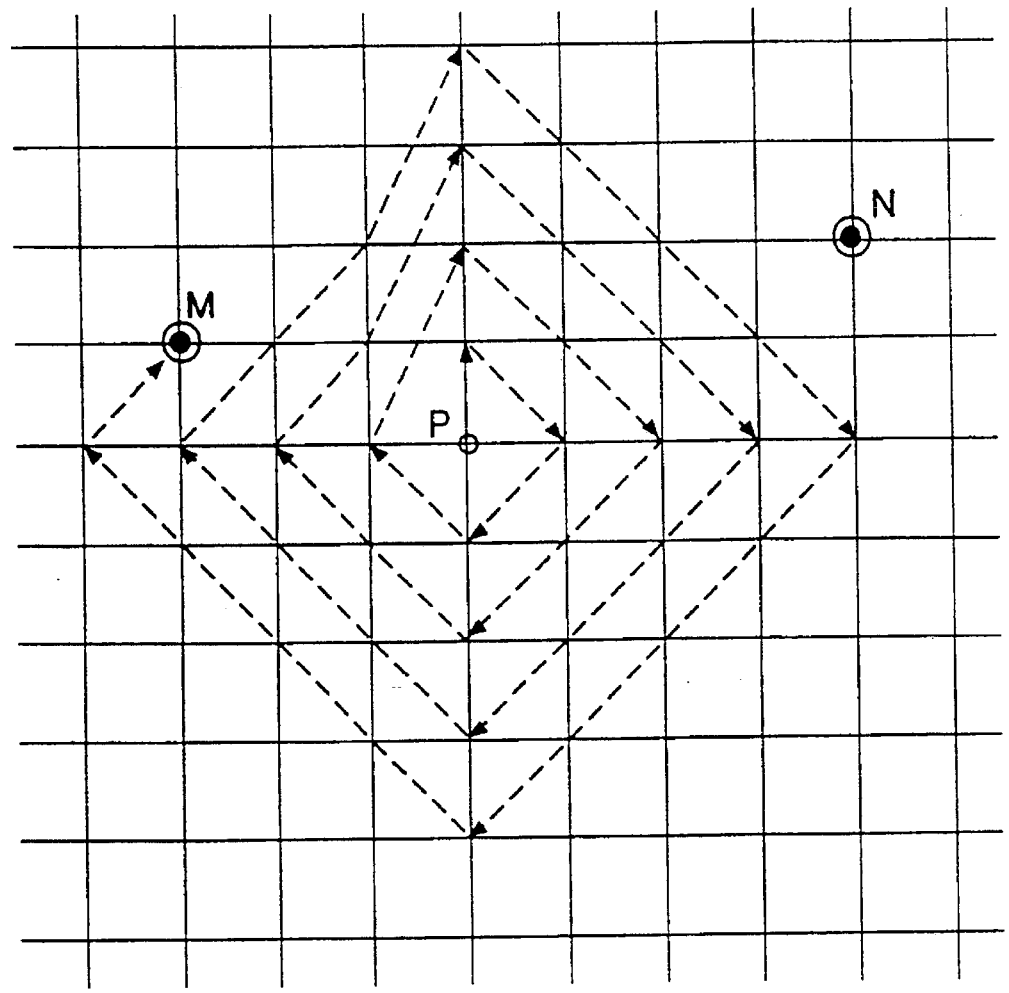
FIG. 6 is a diagram illustrating a luminance function reproduction.

The search that an arbitrary pixel is adjacent to any characteristic point, is performed in the manner illustrated in FIG. 6, for example. In FIG. 6, when pixels M and N of the characteristic points exist near an arbitrary pixel P, if the adjacent pixels are investigated in a spiral shape according to a path shown by the dotted line in the figure from a starting point at the arbitrary pixel P, the dotted line reaches to a pixel M earlier than to a pixel N. This indicates that the pixel P is detected as near to the pixel M of the characteristic point without the pixel N of the characteristic point. Therefore, a sign is attached to the pixel P to show that the pixel P exists in a region of the pixel M of the characteristic point.

FIG. 7 shows a condition wherein a characteristic point symbol of the characteristic point is written to a plurality of arbitrary pixels without the characteristic points in accordance with the procedure which was previously described and shown in FIG. 6. A dotted line joining the characteristic points is a boundary line of an area receiving an influence from the characteristic points. Now, when aiming Δ1 which is a boundary of three regions, three pixels Nj, Nk and Ok are adjacent to one another in the region Δ1. Accordingly, the pixels Nj, Nk and Ok are deemed to be the adjacent characteristic points, and a triangle of Nj, Nk and Ok is deemed to be a luminance interpolation plane. A luminance value of a pixel existing in the triangle of Nj, Nk and Ok is satisfied by the luminance value of the luminance interpolation plane. In the same manner, when another region Δ2 as a boundary of another three regions is aimed, pixels Nj, Oj and Ok are adjacent to the region Δ2. Accordingly, the three pixels Nj, Oj and Ok are supposed as three characteristic points near the region Δ2, and a triangle of Nj, Oj and Ok is deemed to be a luminance interpolation plane. A luminance value of the pixels existing in the triangle of Nj, Oj and Ok is satisfied by the luminance value of the luminance interpolation plane.

In the above procedure, a pixel region receiving an influence of one characteristic point is searched by a decompression plane (solid body in the case of the three-dimensional image), and the luminance function on the decompression side is determined by data of few characteristic points by means of detecting three adjacent characteristic points (four points in the case of the three-dimensional images) from boundary of the pixel region receiving an influence of one characteristic point, thereby reproducing the content of the entire image using the interpolation value satisfying an un-transmitted image data.

A circle, regular square, rectangle and rhombus may be used as a decompression in the case where two-dimensional images are used as an object, and examples of a decompression solid body in the case of the three-dimensional images are a globe, a rotating ellipsoid, two circular cone bodies which are connected with each other having base surfaces as a plane of symmetry, and two pyramid bodies which are connected with each other having base surfaces as a plane of symmetry.

According to the above procedure, the luminance functions on the decompression side are determined on the basis of data of a few characteristic points, and the respective luminance values of the un-transmitted pixel data is interpolated by the luminance value on the luminance interpolation plane, thereby reproducing the content of entire images.

As clarified from the above-description, since the luminance functions of the screen are held in common at both sides namely compression and decompression, it is unnecessary for the number of the pixels on both compression and sides to coincide with each other because position data of the characteristic points are shown by a relative value with respect to the entire screen. Namely, the characteristic data of the images, which are extracted by the multidimensional image compression and decompression system according to the present invention, are reproduced and redrawn corresponding to a number of pixels (a scale of resolution) on the decompression side.

In the multidimensional image compression and decompression system according to the present invention as shown in FIG. 1, the image signal source (for example, the television camera) 1 generates an image signal according to a predetermined standard system of the television system and supplies the image signal to the analog/digital converter 2. Even though any image signal generating apparatus may be used as the image signal source 1, only when it can generate the image data to be compressed and decompressed by the multi-dimensional image compression and decompression of this invention, the following description adopts the mode which generates a black-and white moving image signal in the image signal source 1 for convenience of the description.

The image signal generated by the image signal source 1 is converted into a digital signal by the analog/digital converter 2. The converter 2 converts the analog signal of one scene into the digital signal having a predetermined pixel number in the horizontal and vertical directions, for example, 512 pixels in the horizontal direction and 480 pixels in the vertical direction, and divides the converted digital signal into a unit digital signal having a predetermined bit number (such as 8 bits) per one pixel to supply it to the write controller 3 which controls the unit digital signal writing into the image memories 4a and 4b.

Figure 2:
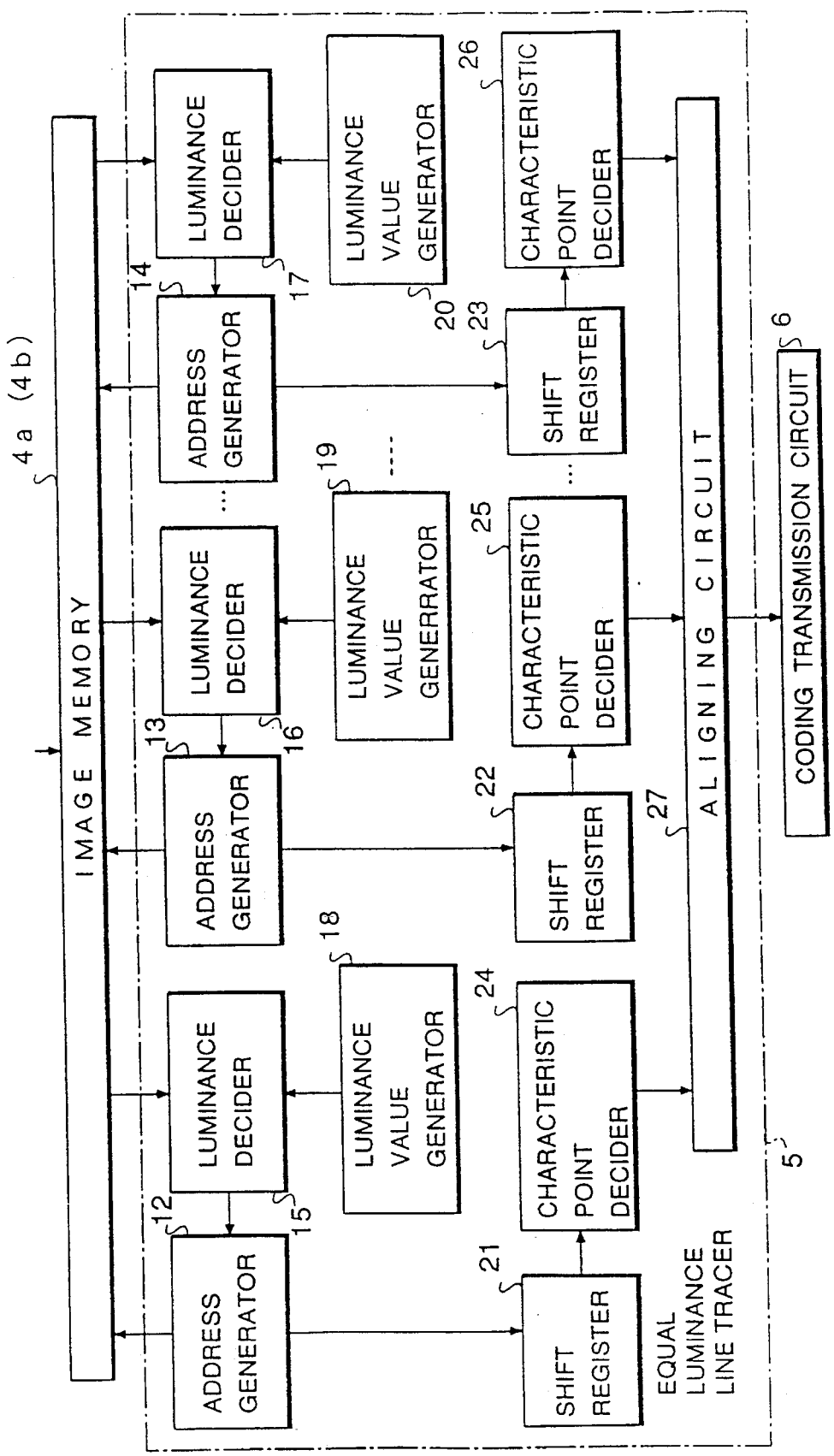
FIG. 2 is a block diagram showing a detailed constitution of an equal luminance line tracer which is used in the multidimensional image compression and decompression system according to the present invention.

The image memories 4a and 4b define a memory for extracting an equal luminance line of a predetermined luminance in the image and for determining characteristic points. The memories 4a and 4b are configured in parallel and alternately performing data writing operation thereinto and data read operation upon determination of the characteristic points. Outputs of the memories 4a and 4b are supplied to the equal luminance line tracer 5 of which the detailed configuration is shown in FIG. 2.

The equal luminance line tracer 5 extracts the equal luminance line in the image and determines the characteristic points. Data of the characteristic points as an object of the determined image data compression are supplied to the coding and transmission circuit 6.

Figure 3:
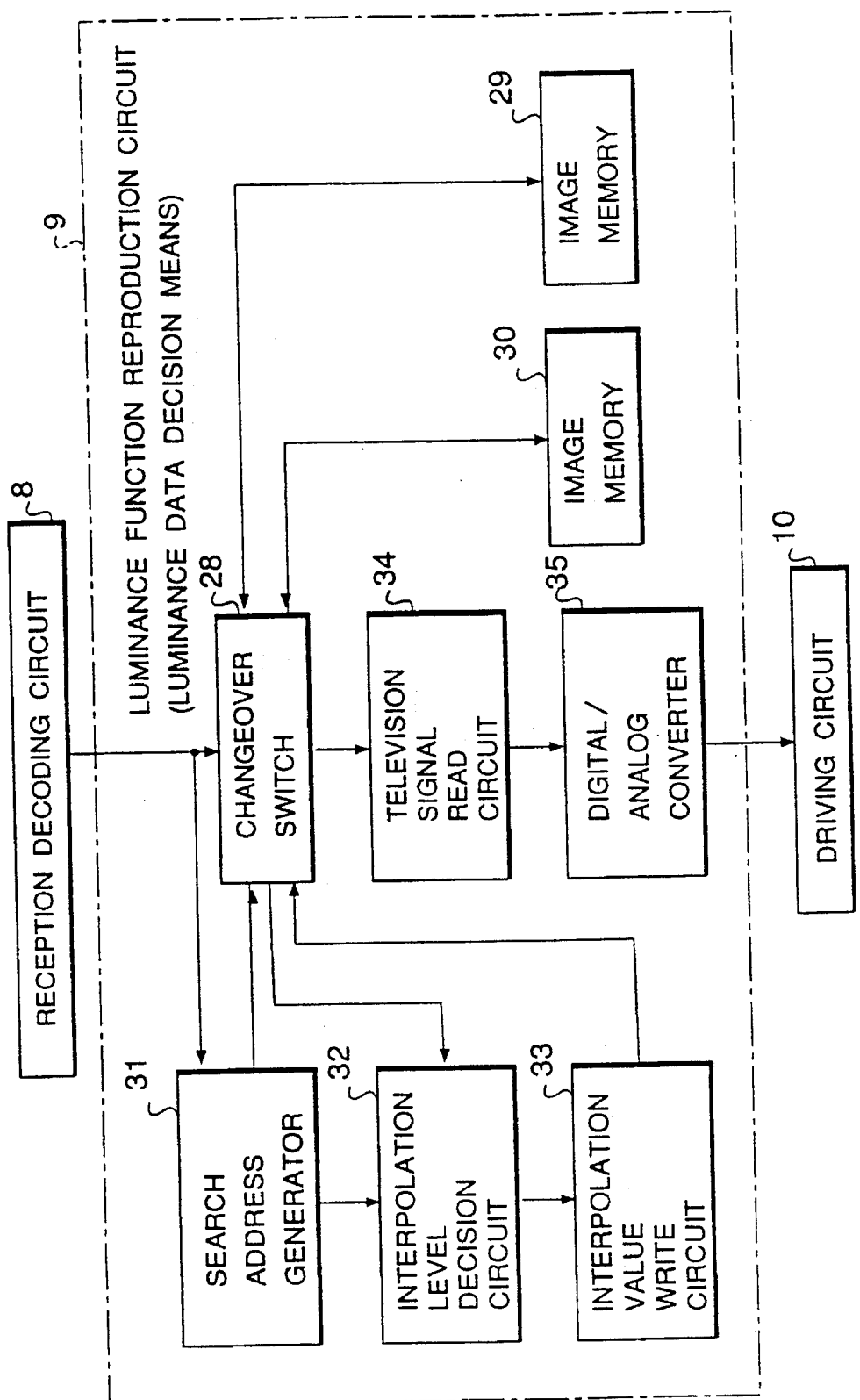
FIG. 3 is a block diagram showing a detailed constitution of a luminance function reproduction circuit used in the multidimensional image compression and decompression system according to the present invention.

The coding and transmission circuit 6 converts the data into codes such as a well-known Huffman code capable of efficiently transmitting the data, and transmits them through the transmission line 7 to the reception decoding circuit 8. The reception decoding circuit 8 decodes the transmitted and coded signals to supply to the luminance function reproduction circuit 9 (the detailed configuration of which is shown in FIG. 3). When the transmission line 7 is displaced by the recording medium, it is understood that the coding transmission circuit 6 is displaced by a recording circuit and the reception decoding circuit 8 is displaced by a reproduction circuit.

The luminance function reproduction circuit 9 restores the two-dimensional luminance functions before a compression by using the supplied characteristic points data. The restored two-dimensional luminance function has a luminance value for each pixel, and the luminance value is read out as a time series signal in an analog signal mode to be supplied to the driving circuit 10. The driving circuit 10 generates a picture signal to be supplied and displayed to and on the monitor television receiver 11.

The detailed constitution of the equal luminance line tracer 5 which is shown as a block 5 in FIG. 1 will now be described with reference to FIG. 2. In FIG. 2, a plurality of signal transmission paths are provided between the image memories 4a and 4b (FIG. 2 only shows a memory 4a as one of the image memories) and the equal luminance line tracer 5. The equal luminance line tracer 5 comprises a plurality (a number of n) of address generators 12–14, luminance deciders 15–17, luminance value generators 18–20, shift registers 21–23, and characteristic point deciders 24–26, respectively, and an aligning circuit 27.

The luminance decider 15 (16, . . . , 17) reads out the luminance data from a storage region of a predetermined address in the image memory 4a which is specified by the address generator 12 (13, . . . , 14), respectively. On the other hand, the luminance value generator 18 (19, . . . , 20) supplies the predetermined luminance value to the luminance decider 15 (16, . . . , 17), respectively. The luminance decider 15 (16, . . . , 17) compares the read luminance data of the memory 4a with the predetermined luminance data of the generator 18 and supplies the compared result to the address generator 12 (13, . . . , 14).

The address generator 12 generates new address (including an intermediate address between the pixel addresses) data corresponding to a point M1 in FIG. 4B to supply the new address to the memory 4a (4b). It is understood that other address generators 13, . . . , 14 generate new address data.

The image memory 4a (4b) supplies the luminance value data of the storage region of the address which is specified by the address data from the address generator 12 (13, . . . , 14) to the luminance decider 15 (16, . . . , 17) of the equal luminance line tracer 5.

The luminance decider 15 (16, . . . , 17) compares the luminance value data read out from the image memory 4a (4b) with the predetermined luminance value data generated in the luminance value generator 18 (19, . . . , 20), and supplies the comparison result to the address generators 13 (14, . . . , 15). After that, the same operation is repeated in order, thereby sequentially generating an address value having an equal luminance value which is equivalent to the luminance value shown by the predetermined luminance value data generated by the luminance value generator 18 (19, . . . , 20). Each of the address values is displaced into an address value of the adjacent pixel when each address value shows an intermediate value of the pixel address values as shown in FIGS. 4A and 4B, thereby sequentially repeating the above-mentioned operation.

The address data generated by the address generator 12 (13, . . . , 14) also supplied to a shift register 21 (22, . . . , 23) which supplies a parallel output to a characteristic point decider 24 (25, . . . , 26). When the shift register 21 stores the address data having a predetermined number (such as 10) of the pixels, a new address is inputted into the characteristic point decider 24, and at each time where the oldest one address is disappears, a pixel deemed to be the characteristic point is detected from the address group according to the above-mentioned criterion for judging the characteristic points. An address value and a luminance value of the pixel as the characteristic point are supplied to the aligning circuit 27 which performs an aligning operation for classifying the address value and luminance value in the characteristic point group outputted from a plurality of the characteristic point deciders 24, 25, . . . , and 26 and each having a different equal luminance value on the basis of each class of the equal luminance values to be transmitted. An output of the aligning circuit 27 is supplied to the coding transmission circuit 6 as an output of the equal luminance line tracer 5. Since the equal luminance line tracer traces in parallel with a plurality of the equal luminance lines for signal processing, a memory having a multi-port configuration is used for the image memory 4a (4b).

With regard to time, at a point in time when a scanning is completed for one screen or frame (in the case where an interlaced scanning system is used as a scanning standard, one field time period) by the equal luminance line tracer 5, an extraction of the characteristic point is completed with respect to the screen itself. In the coding transmission circuit 6 to which the output of the equal luminance line tracer 5 is supplied, the output of the tracer 5 is converted into a well-known code such as a Huffman code capable of efficiently transmitting the data as described above, and a converted code signal is transmitted through the transmission line to the reception decoding circuit 8. After extraction of the characteristic points is completed, the next execution for extracting the characteristic points from the next screen is performed during a time period necessary for converting the data into a well-known code such as Huffman code and necessary for transmitting the code signal through the transmission line 7 to the reception decoding circuit 8. When the time period represented by sum of the coding time and the transmitting time is more than the time required to scan one screen because the detection number of the characteristic points in one screen is large, it is desirable to provide an embodiment which automatically regulates in a limiting manner an angle and a distance of the threshold value which is used for the detection of the characteristic points.

The reception decoding circuit 8 decodes the transmitted and coded signals to supply them to the luminance function reproduction circuit 9 as luminance data decision means. FIG. 3 shows a detailed constitution of the luminance function reproduction circuit 9 which is shown as a block 9 in FIG. 1. In FIG. 3, numeral 28 denotes a changeover switch, 29 and 30 denote image memories, 31 denotes a search address generator, 32 denotes an interpolation level decision circuit, 33 denotes an interpolation value write circuit, 34 denotes a television signal read circuit, and 35 denotes a digital/analog converter. In the luminance function reproduction circuit 9, the characteristic data which is supplied from the reception circuit 8, is used for a restoration of the two-dimensional luminance function before compression.

When the luminance function reproduction circuit 9 receives the characteristic point data, that is, the address value and the luminance value of the characteristic points as input data, the data is supplied for storage through the changeover switch 28 to any of the image memories 29 and 30.

The reason why two image memories 29 and 30 are changed over in use, is to cause the entire decompression operation in the system to be high-speed by enabling the simultaneous operation facilitated by using one memory for decompression, and the other of the memories for reading and displaying the decompressed image data.

The search address generator 31 generates an address of a pixel except the characteristic points stored in the image memory 29 (or 30), and at the same time, searches a pixel of the characteristic point most adjacent to the pixel of which the address is generated in accordance with the method explained using FIG. 6. The search address generator 31 marks a sign showing that the pixel is within the pixel region of the characteristic point most adjacent to the pixel (in an attribute region of the characteristic point pixel).

Furthermore, the interpolation level decision circuit 32 searches a regional boundary by reading out the attribute region of the image memory 29 (or 30), and extracts three characteristic points from particular characteristic points of the adjacent regions for determining the interpolation.

Still furthermore, the interpolation value write circuit 33 calculates an interpolational value within an internal region of the interpolational triangle plane which is determined in the image memory 29 (or 30) by the decision circuit 32, and performs a write operation of the luminance value of the pixels except for any characteristic point existing in the internal region in order to satisfy the interpolational value assigned to the image memory 29 (or 30).

The television signal read circuit 34 reads out the pixel data stored in a memory 30 (or 29) different from the other memory 29 (or 30) which is now processing, as a time series image signal in accordance with a predetermined standard system. The time series image signal is converted into an image signal in an analog signal mode by the digital/analog converter 35, so as to supply it to the driving circuit 10. The driving circuit 10 adds a blanking signal and a synchronous signal with the analog image signal so as to supply it to the monitor television receiver 11 (see FIG. 1) for displaying the reproduced image on the displaying screen thereof.

Even though the previous description relates to the case where the multidimensional image compression and decompression system according to the present invention is applied to the reproduction of the two-dimensional luminance function, the system of the present invention may be easily applied to the three-dimensional image compression and decompression system in which the characteristic points are extracted from a plurality of screens including a time base. There will be described an embodiment in which the present invention is applied to the three-dimensional image compression and decompression system for extracting the characteristic points from a plurality of the screens including the time base with reference with FIG. 8.

Figure 8:
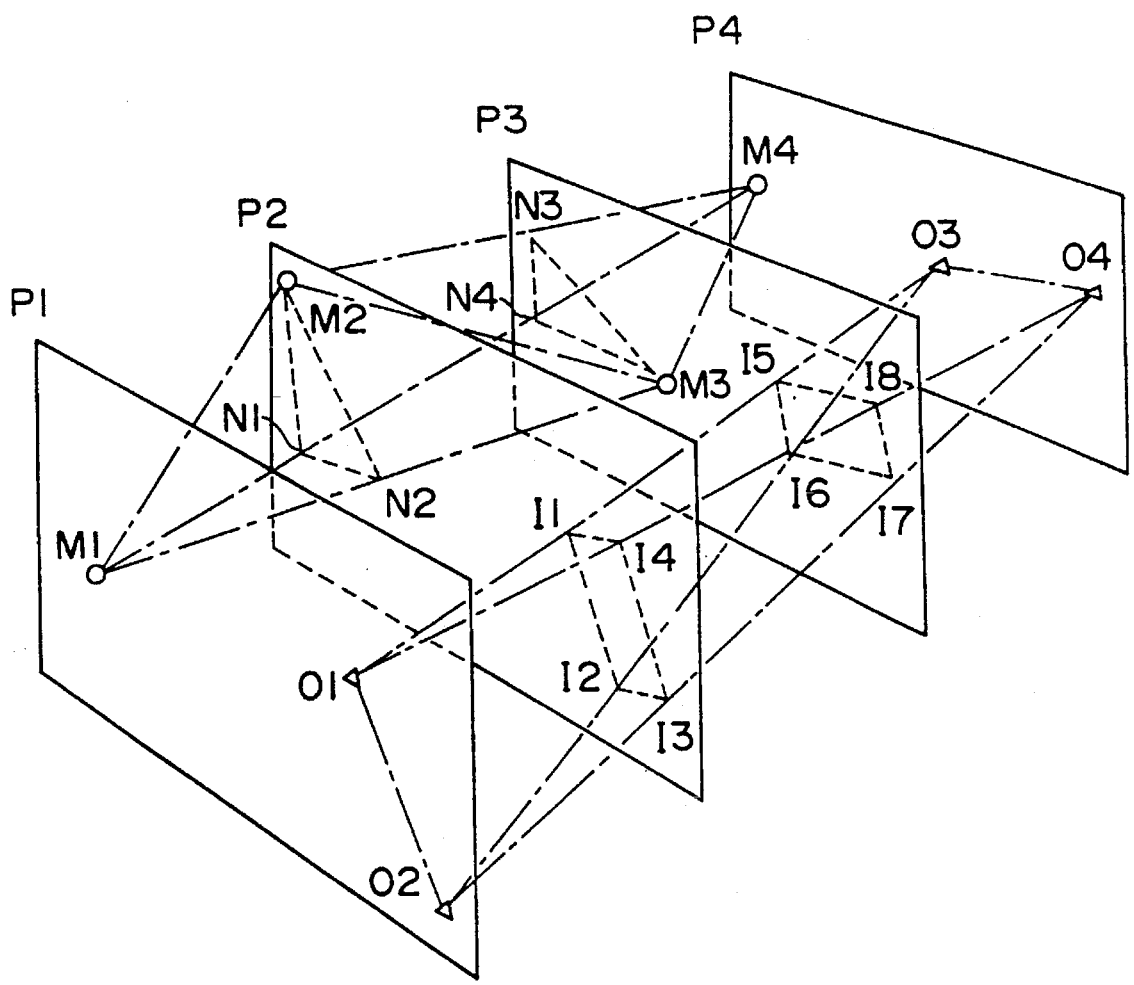
FIG. 8 is a diagram illustrating the case where luminance data of pixels without characteristic points are determined by an interpolation solid body which is determined of the characteristic points detected from image data distributed in a three dimensions.

FIG. 8 shows an embodiment in the case where the luminance data of the pixels except the pixels of the characteristic points are determined by an interpolational solid body which is determined by the characteristic points detected from image data distributed in the three dimensions. In FIG. 8, images P1–P4 show a static image group arranged on the time base, and the entire image data has a three-dimensional distribution.

With respect to the two-dimensional luminance function in the static image P1–P4 shown in FIG. 8, an equal luminance line can be obtained at tracing by using an equal luminance, while an equal luminance plane can be obtained when the trace is extended in the three dimensions. The characteristic points are determined by the local maximum points in the positive and negative of the curvature on the equal luminance plane, or the points in which the difference between the equal luminance plane and an approximated plane thereof become more than the predetermined threshold value. The characteristic points are shown as symbols M1–M4 in FIG. 8. When the characteristic points are judged as being adjacent in the three dimensions, an interpolational solid body is defined by M1, M2, M3 and M4.

A section of the interpolational solid body M1, M2, M3 and M4 by the static image P2 is a triangle M2, N1 and N2, and a section of the interpolational solid body M1, M2, M3 and M4 by the static image P3 is a triangle M3, N3 and N4. Since the luminance values of respective vertexes of respective triangles can be determined by an interpolational calculation on the basis of the luminance values of vertexes of the interpolational solid body M1, M2, M3 and M4, the luminance value of each pixel in the internal area of each triangle can be determined by the method similar to the case of determining the luminance of the un-transmitted pixel in the two-dimensional image by the interpolational plane.

In FIG. 8, if the three-dimensional characteristic points are not detected in the above manner, it is possible to obtain the characteristic points O1 and O2 as the result of performing the two-dimensional characteristic point detection with respect to the static image P1, and to obtain the characteristic points O3 and O4 as the result of performing the two-dimensional characteristic point detection with respect to the static image P4 which has a predetermined time distance. As a result, when there are two-dimensional adjacent points, an interpolational solid image O1, O2, O3 and O4 is defined. A section by the static image P2 of the interpolational solid image O1, O2, O3 and O4 is a quadrangle I1, I2, I3 and I4, and a section by the static image P3 of the interpolational solid image O1, O2, O3 and O4 is a quadrangle I5, I6, I7 and I8. Even though this case is different from the exemplary triangle of the interpolational plane, since the general polygon can be divided into a plurality of triangles, it is possible to define a single interpolational plane in this case. In the same manner as the two-dimensional method, it is possible to determine a luminance value of each pixel existing in the internal portion of each triangle by means of a method equal to the case where the un-transmitted pixel luminance is determined by the interpolational plane with respect to the above-mentioned two-dimensional image data.

What is claimed is:

1. A multidimensional image compression and decompression system having a compression device which codes image data at least including a two-dimensional static image for transmission, and a decompression device which reproduces image data by decoding a coded image signal transmitted from said compression device: comprising luminance decision means provided at said compression device, for deciding how luminance data included in said image data is distributed in at least two dimensions on the basis of a reference value;

address generation means provided at said compression device, for generating position data after determining at least two-dimensional positions of distribution of said luminance data determined by said luminance decision means;

characteristic point decision means provided at said compression device, for determining a plurality of characteristic points which are local maximum points in a curvature of an equal luminance line of a luminance function at least in said two-dimensional static image on the basis of said luminance data decided by said luminance decision means, and said position data generated by said address generation means with respect to said at least two-dimensional static image; and luminance data decision means provided at said decompression device, for deciding luminance data of pixels except pixels corresponding to said characteristic points by using interpolational data which includes at least a plane for interpolation, which is determined by several adjacent points in said plurality of characteristic points in at least said two-dimensional static image reproduced by image data supplied from said compression device, thereby forming a multidimensional reproduced image using both said luminance data of said characteristic points and said luminance data of said pixels except said pixels corresponding to said characteristic points.

2. The multidimensional image compression and decompression system according to claim 1, wherein said characteristic points are local maximum negative points and local maximum positive points in a curvature of said equal luminance line of said luminance function with respect to said image data constituted from said luminance data distributed in said two-dimensional static image; and said decompression device decompresses a compressed multidimensional image by using a position and a luminance value of said characteristic points for transmission, recording and restoration of images.

3. The multidimensional image compression and decompression system according to claim 1, wherein said characteristic points are maximum positive points and maximum negative points of curvature of an equal luminance plane of said luminance function with respect to said image data constituted from said luminance data distributed in said two-dimensional static image and a three-dimensional image including a time base;

said decompression device decompresses a compressed multidimensional image by using a position and a luminance value of said characteristic points for transmission, recording and restoration of images; and said luminance data except pixels corresponding to said characteristic points are determined by an interpolational solid body which is determined by a plurality of adjacent characteristic points during decompression.

4. The multidimensional image compression and decompression system according to claim 1, wherein said characteristic points are local maximum negative points and local maximum positive points of curvature of said equal luminance line of said luminance function of each pair in a plurality of pairs of luminance values which are an object of processing and distributed in two dimensions, with respect to said image data constituted from said luminance data distributed in said two-dimensional static image and a three-dimensional image including a time base;

said decompression device decompresses a compressed multidimensional image by using a position and a luminance value of said characteristic points for transmission, recording and restoration of images; and said luminance data except pixels corresponding to said characteristic points are determined by an interpolational solid body which is determined by a plurality of adjacent characteristic points during decompression.

5. The multidimensional image compression and decompression system according to claim 1, wherein said characteristic points are points at which the difference between said equal luminance line of said luminance function and an approximated straight line of said equal luminance line exceeds a predetermined threshold value, with respect to said image data constituted from said luminance data distributed in said two-dimensional static image; and said decompression device decompresses a compressed multidimensional image by using a position and a luminance value of said characteristic points for transmission, recording and restoration of image.

6. The multidimensional image compression and decompression system according to claim 1, wherein said characteristic points are points at which the difference between an equal luminance plane of said luminance function and an approximated plane of said equal luminance plane exceeds a predetermined threshold value, with respect to said image data constituted from said luminance data distributed in said two-dimensional static image and in a three-dimensional image including a time base;

said decompression device decompresses a compressed multidimensional image by using a position and a luminance value of said characteristic points for transmission, recording and restoration of images; and said luminance data except pixels corresponding to said characteristic points are determined by an interpolational solid body which is determined by a plurality of adjacent characteristic points during decompression.

7. The multidimensional image compression and decompression system according to claim 1, wherein said characteristic points are points at which the difference between an equal luminance line of said luminance function and an approximated straight line of said equal luminance line exceeds a predetermined threshold value, to be processed and distributed in two dimensions, with respect to said image data constituted from said luminance data distributed in said two-dimensional static image and in a three-dimensional image including a time base;

said decompression device decompresses a compressed multidimensional image by using a position and a luminance value of said characteristic points for transmission, recording and restoration of images; and said luminance data except pixels corresponding to said characteristic points are determined by an interpolational solid body which is determined by a plurality of adjacent characteristic points during decompression.

8. The multidimensional image compression and decompression system according to claim 1, wherein said image data includes color data with respect to three primary colors (primaries).

* * * * *